Sept. 17, 1935.  H. F. SPOEHRER  2,014,911

CONNECTION FOR FLUID LINES

Filed Oct. 18, 1934

INVENTOR.
HERMANN F. SPOEHRER
BY
Robert B. Terry
ATTORNEY.

Patented Sept. 17, 1935

2,014,911

UNITED STATES PATENT OFFICE 2,014,911

CONNECTION FOR FLUID LINES

Hermann F. Spoehrer, St. Louis, Mo.

Application October 18, 1934, Serial No. 748,812

3 Claims. (Cl. 285—138)

This invention relates to improvements in connections for fluid lines, and particularly to an improved joint assembly for use in high pressure fluid tubing such, for example, as is required in effecting connections between the piping and items of apparatus of a refrigeration system.

A general object of the invention is attained in an improved joint structure for the purpose noted, which obviates any contact of the circulated fluid with the usual joint compounds, and of such nature as to facilitate breaking the joint where necessary for repair or service purposes, without resoldering. The invention attains a fluid connection in which the sealing portions of the structure are detachably structurally assembled when in service, and in which the mating parts are preferably not threadedly connected.

Another object of the invention is attained in an improved joint or fluid connection which obviates one of the two sealed joints prevailing in such connections according to the practice heretofore prevalent.

Yet another object of the invention is attained in a structure which obviates much of the difficulty heretofore experienced in sweating or soldering the tubing, such as flexible copper tubing, when in place on the job, and which overcomes many of the adverse effects due to unequal expansion and electrolytic phenomena attending the use of dissimilar metals in contact with each other.

Still a further object of the invention is attained in a joint which obviates the need of any joint compound whatsoever, and hence obviates the adverse chemical effects of certain refrigerants on such compounds.

More particularly stated in reference to the example disclosed, and in keeping with the acceptability of and preference for flange type joints and connections, it is a further object of the invention to improve the joint constructions particularly designed for use with existing refrigeration equipment and accessories, such, for example, as magnetic and thermostatic control valves, thus requiring no modification of such accessories to accommodate them to the improved type of fluid connections exemplifying the present invention.

Figure 1:
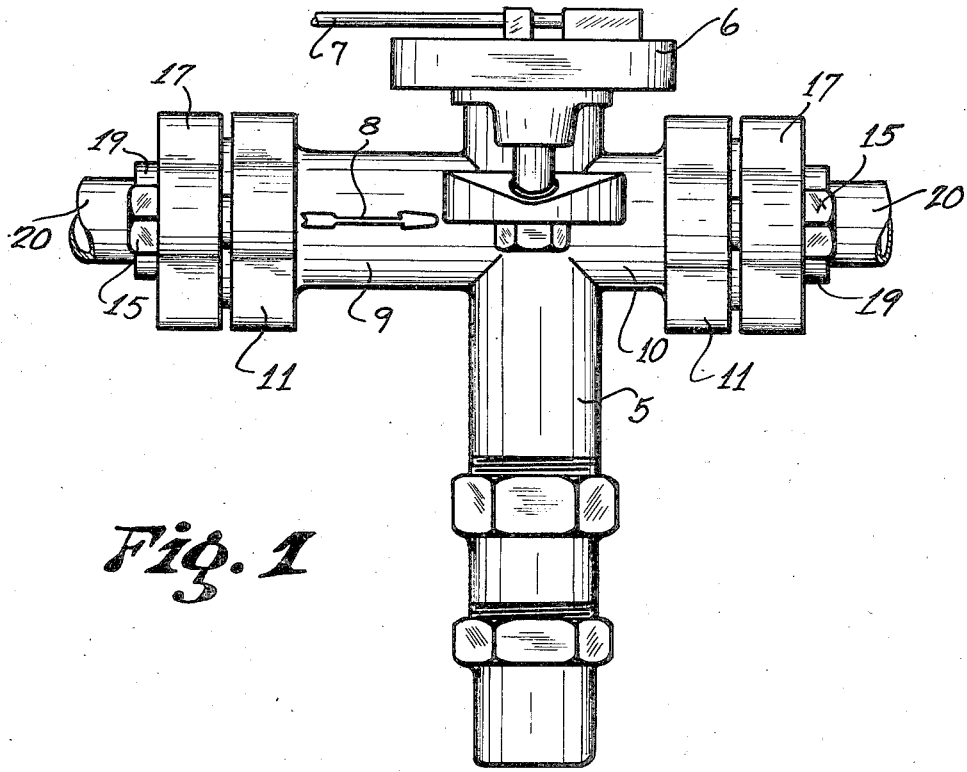
Figure 2:
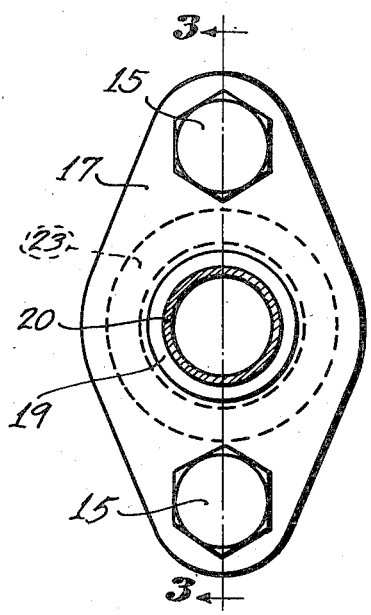
Figure 3:
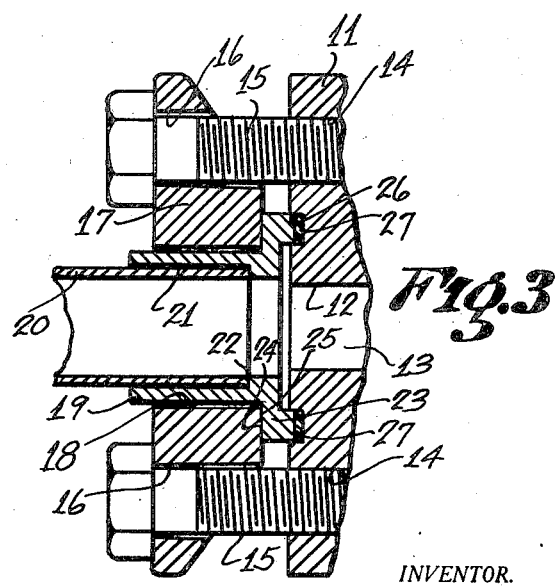

The foregoing and still further objects will more fully appear from the following detailed description of an exemplary embodiment of the invention as applied for connecting a refrigeration pipe line and a refrigeration control valve, the description being best understood in connection with the accompanying drawing, in which:

Fig. 1 is a side elevation of a thermostatic expansion valve equipped with connections in accordance with the present design; Fig. 2 is an end elevation of a joint or connection of the type utilized in the construction of Fig. 1, but showing the flange element as vertically disposed, and Fig. 3 is a section as viewed in the plane of line 3—3 of Fig. 2.

Referring by characters of reference to the drawing, the body of a refrigeration control valve 10 is indicated at 5, and includes a diaphragm casing or chamber 6 to which is connected a tube 7 having connection with a bulb (not shown) containing a control fluid. The body 5 is T-shaped in side elevation and equipped internally with control valve mechanism not necessary here to be described, as constituting of itself no part of the present invention. The course of the refrigerant is from left to right of Fig. 1, as indicated by the arrow 8. The horizontal extensions 9 and 10 of the body are each provided with an end wall portion 11, each of these wall portions being centrally apertured as at 12, (Fig. 3) to form an intake or outlet port, and a passage 13 constituting a continuation of such port.

As thus far described, the valve body, usually formed of cast iron or an equivalent, is adapted for the reception of conventional fluid connections, which, according to prevailing practice, are of flange type. Into each of the flanges of the older type of connection is threaded a one-piece fitting, usually a copper or brass bushing characterized by a socket portion into which the end of the tube is sweated. The socket portion is extended to form a threaded end, and the flange is centrally tapped so as to engage this threaded extension. At the point where the conventional bushing is threaded into the flange, a joint compound, such as pipe cement or glycerine and litharge, is often employed to augment the seal between the bushing and the flange. Occasionally this threaded joint is soldered or brazed. In any event, in case it is necessary for servicing the valve or replacement thereof to break the connection between the valve and the flange, more often than not, this results in breakage of the bond between the tubing and the socket of the bushing. Replacement of a unit connected into the line by the older conventional joint structure obviously requires reapplication of a joint compound, and further sweating of the tubing into the socket of the bushing, all of which is obviated by the present construction.

According to present preference, each of the wall portions 11 is tapped at diametrically opposite points, the tapped openings being shown at 14 for the reception of cap screws 15 which extend freely through diametrally opposite openings 16 disposed near the extremities of a clamping flange 17, formed preferably of cast iron or an equivalent. The flange is centrally apertured as at 18 to receive, with a substantial clearance, a bushing or thimble element 19. The element 19 is, by preference, formed of brass or similar material, in case a tubing of copper or brass is employed according to usual practice. An end portion of a copper tube 20 is inserted in the socket portion of element 19, the internal diameter of this socket portion being such as to provide at least a few thousandths of an inch clearance between the outside of the tube wall and the inside wall of the socket. This clearance is utilized for the reception of solder, the resulting annulus of which in assembly is indicated at 21. As best appears from Fig. 3, the end of the tube is bottomed against a shoulder 22 to insure a uniform engagement between the tube and socket of the bushing. This arrangement further serves to improve the seal and bond between the tube, solder and bushing.

The inner end of the bushing 19 is characterized by a projection 23 of annular form, the outer face 24 thereof being preferably machined to engage a companion annular face 25 on the inner surface of the flange, and which may also be machined so as evenly to engage the face 24.

As best appears from Fig. 3, the annular portion 23 is substantially of L shape in radial section, its outer extremity being angulate and forming an annular sealing ring interfitting an annular recess 26. The outer face of this interfitting annular portion is, by preference, machined so as to present a smooth planar surface, which in assembly engages a compressible ring of gasketing material 27. The latter may consist of fiber of a suitable quality, or of an asbestos compound, in many cases a ring or washer of lead sufficing as a compressible sealing material within this joint. Any other suitable gasketing material may however be employed, the nature thereof being dependent upon the range of pressures within the line 20 and the connected unit such as the valve, and depending also to a certain extent upon the nature of the refrigerant employed.

The manner of effecting a joint assembly through utilization of the structure described, is thought to be apparent from the foregoing description of parts, but may be particularized in reference to the illustrated structure. The requisite length of tubing 20 is cut or sawed to provide a smooth end face for abutment with the internal shoulder 22 of the bushing 19. The flange 17 is inserted over the tube 20, and the bushing and tube end are desirably heated to a certain extent to prevent premature setting of the solder. With the parts in interengagement as shown by Fig. 3, the solder 21 is poured about the tube end into the socket of the bushing and permitted to freeze before further operations.

The flange 17 may now be drawn to a position so that the outer plane face 24 of the annular portion 23 of the bushing engages the plane face 25 of the flange. The angulate rim of projection 23 of the bushing is now brought into the recess 26 overlying the gasket 27 therein. With the parts thus positioned, the cap screws 15 are inserted through openings 16 and threaded up into the tapped apertures 14 of the body wall 11. Care is preferably taken to thread up the screws 15 evenly so as to avoid cocking or cramping the bushing with respect to the tube, and so as to insure placement of the annular flange 23 at an even depth in the recess 26. As the screws 15 are threaded up, the gasket 27 becomes compressed and so constitutes a tight fluid seal about this zone.

It will have been observed that the fluid connection illustrated is characterized by only a single sweated joint, identified with the layer of solder 21, and that all additional sealing effect is attained by interengagement of the parts 23 and 26. It is further to be seen that in the event necessity arises for replacement of a valve in an existing line, this may be accomplished simply by removal of the cap screws 15 at each end, after which the valve may be taken out of the line without disturbance or breakage of even the single sweated joint.

It is further to be observed that the former difficulty of sweating or soldering a tube on the job has been considerably relieved by employing only a relatively thin wall brass bushing for sweating to the tube end. The former difficulty experienced in premature freezing of the solder by the substantial mass of adjacent metal, is fully obviated, as are also the difficulties heretofore noted as arising from unequal expansion of the soldered dissimilar metals constituting the flange and bushing. Further there are obviated all undesirable electrolytic effects arising out of contact of ferrous with non-ferrous metals.

The improved joint of my invention possesses, as will appear from the drawing, the advantage of keeping the refrigerant out of contact with any joint compound which may be utilized. This feature is of particular value since the advent into commercial and domestic fields of refrigeration, units employing Freon (F-12) as a refrigerant. This substance appears from experience, somewhat adversely to affect the lead glyceride formed by the mixture, as a joint compound, of litharge and glycerine. From the foregoing description and the drawing, it will also appear that the fluid connection in the preferred form herein described, fully attains each of the several objects above appearing.

While I have described the invention by making particular reference to a preferred embodiment thereof, and have illustrated its advantages by its application in a single selected field to which it is particularly applicable, it is nevertheless to be understood that many changes may be made in the parts shown as well as in their combinations and arrangement, without departing from the full intended scope of the invention as defined by the claims hereunto appended.

I claim:

1. In a connection for refrigeration lines and the like, in combination with a refrigerant valve body having an apertured wall portion and a tube of flexible thin-wall type to be fluid-connected to the body through the aperture, a thimble forming a socket for one end of the tube and having an internal diameter exceeding the external diameter of the tube, and sweated thereto, an annular internal shoulder on which the tube end is bottomed, the thimble beyond the socket portion being characterized by a shoulder portion of annular form having a flat face projecting in a plane transverse to the axis of the tube and a terminal annular portion lying parallel to the axis of the tube, the body having an annular recessed seat to accommodate, in interfitted relation, the latter projection, a gasket of compressible sealing material in and laterally confined by said seat, a clamping flange centrally apertured to receive the socket portion of the thimble, and apertured near its extremities to receive holding screws, the internal face of the flange bearing against the flat face on the first said annular projection on the thimble, and cap screws in threaded engagement with the wall portion of the body and extending through the screw apertures of the flange, the screws being arranged, when threaded into the body, to clamp the projecting portions of the thimble into sealing relation with the gasket, and with said annular projecting portions intervening the flange and the body.

2. In combination with a refrigerant control valve including a valve body element having a flat wall surface and a fluid port, and a tube of flexible, thin-wall type in fluid connection with the body element through said port, a bushing element receiving an end of the tube having an internal shoulder abutting said end, and metallically united thereto, an annular recess in the wall of the body, and an interfitting annular projection on the bushing element about the zone of said port, said recess and projection each being of rectangular section to provide a substantial area of sealing engagement, a clamping flange, a radially projecting annular portion on the bushing, between the flange and body element, from which said annular projection is extended at a distinct angle toward the valve body, and screw-threaded means including screw seats in the valve body wall, for securing the flange and body together with the projecting portion of the bushing therebetween and with the said annular projection embedded in the recess.

3. In combination with a refrigerant control valve including a valve body having an apertured wall portion and a tube to be fluid-connected to the body through the aperture, a thimble forming a socket for one end of the tube, provided with an internal shoulder at the inner end of the socket and having an internal diameter exceeding the external diameter of the tube, and sweated thereto, the thimble beyond the socket portion being characterized by a portion of annular form projecting in a plane transverse to the axis of the tube and so forming an annular shoulder exterior to and radially beyond the socket portion, and a terminal annular portion lying parallel to the axis of the tube and provided with a planar end face, the valve body provided with a plane face having an annular recessed seat to receive in interfitted relation the latter projection, a gasket of compressible sealing material in and laterally confined by said seat, a clamping flange centrally apertured to receive the socket portion of the thimble, and apertured near its extremities to receive holding screws, screw seats therefor in the plane face of the valve body, the internal face of the flange bearing against the first said annular projection on the thimble, and cap screws in threaded engagement with the screw seats in the body and extending through the screw apertures of the flange, the screws being arranged, when threaded into the body, to clamp the terminal annular portion of the thimble into sealing relation with the gasket, and with said annular projecting portions intervening the flange and the body.

HERMANN F. SPOEHRER.